United States Patent [19]
Shirie et al.

[11] Patent Number: 5,181,144
[45] Date of Patent: Jan. 19, 1993

[54] INITIAL FOCUSING MECHANISM FOR ZOOM LENS SYSTEM

[75] Inventors: Nobuyuki Shirie; Kazunori Ohno, both of Ohmiya, Japan

[73] Assignee: Fuji Photo Optical Co., Ltd., Ohmiya, Japan

[21] Appl. No.: 765,531

[22] Filed: Sep. 25, 1991

[30] Foreign Application Priority Data

Sep. 28, 1990 [JP] Japan .................. 2-259717

[51] Int. Cl.⁵ ............................... G02B 15/14
[52] U.S. Cl. .................... 359/700; 359/702; 359/695; 354/195.12
[58] Field of Search ........... 359/699, 700, 701, 702, 359/695, 694; 354/195.12, 400

[56] References Cited

U.S. PATENT DOCUMENTS 4,255,020  3/1981  Yukio ........................ 359/699
4,533,218  8/1985  Nakazato et al. ............ 359/702

Primary Examiner—Loha Ben
Attorney, Agent, or Firm—Price, Heneveld, Cooper, DeWitt & Litton

[57] ABSTRACT

An initial focusing mechanism for a zoom lens system adapted to achieve the initial focusing by moving a variator lens and a compensator lens along an optical axis with respect to a focusing lens. A cylinder cam is slidably movable within a barrel along the optical axis. The cylinder cam carries the variator lens and the compensator lens and is rotatable with respect to the barrel during zooming so that the variator lens and compensator lens can be moved along the optical axis maintaining a given inter-lens optical relationship. A slide element is provided for moving the cylinder cam along the optical axis and locking the cylinder cam at a selected position relative to the barrel. For initial focusing, the cylinder cam is slidably moved along the optical axis which adjustably moves the variator lens and the compensator lens relative to the focusing lens. Upon completion of this adjustment, the cylinder cam is fixed to the barrel.

5 Claims, 4 Drawing Sheets

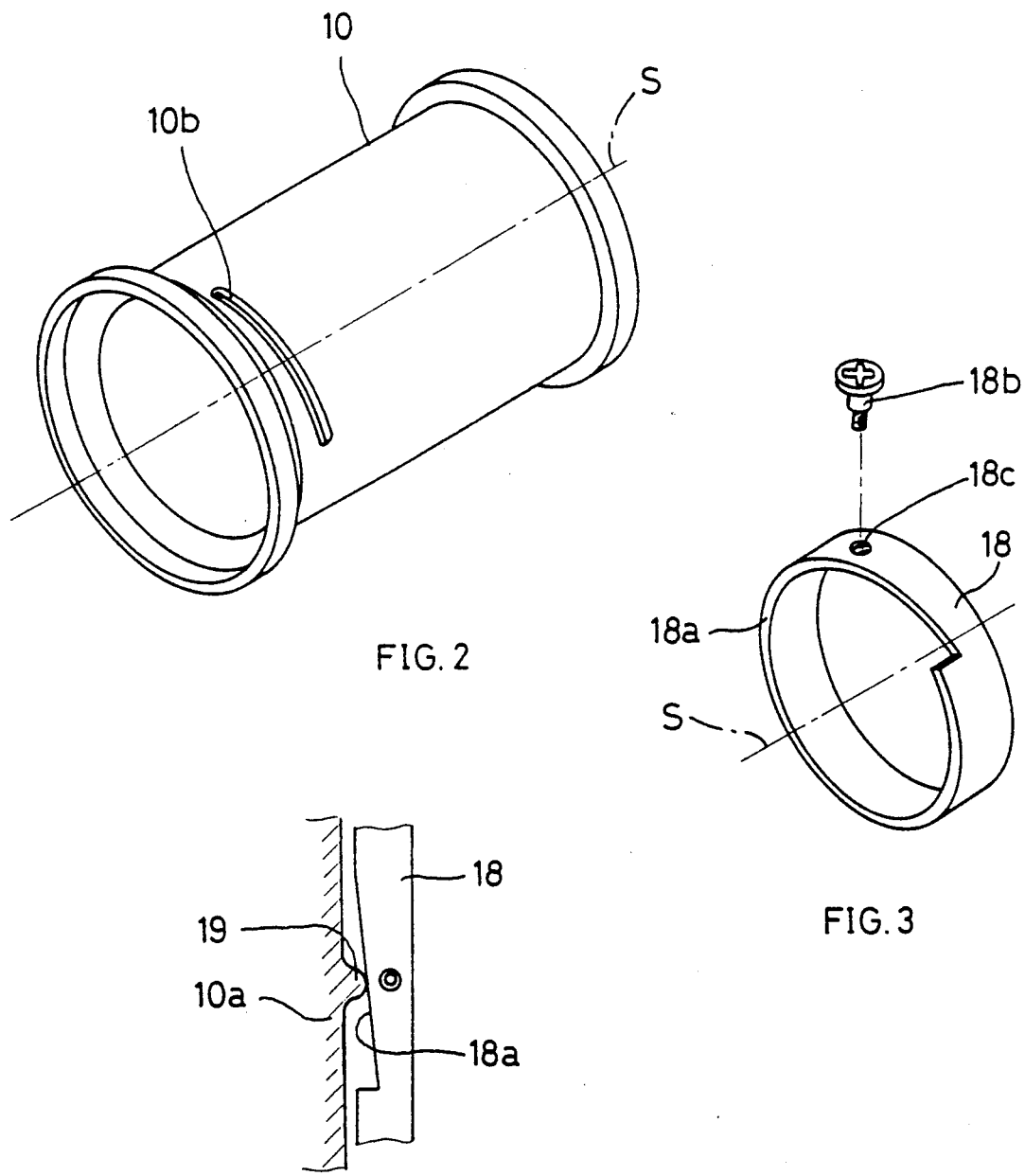

INITIAL FOCUSING MECHANISM FOR ZOOM LENS SYSTEM

BACKGROUND OF THE INVENTION

1. Technical Field

The present invention relates to an initial focusing mechanism for a zoom lens system used to achieve initial focusing with various lens such as a variator, a compensator and focusing lenses having been assembled to a barrel so that a focal distance may be reliably varied by zooming with a given optical relationship among the various lenses being maintained.

2. Prior Art

The zoom lens system is generally used to vary a focal distance in a continuous manner and, for this purpose, is adapted to move the photographic lenses including the variator lens and the compensator lens along an optical axis with a given optical relationship among these lenses being maintained. To maintain the given optical relationship, the barrel holding these photographing lenses is formed with cam tracks or the like so that the photographing lenses are supported by the cam tracks of the barrel and movement of the photographing lenses is guided by the cam tracks.

In the course of zooming, the respective photographing lenses must be kept at given positions along the associated cam tracks and, to this end, the initial focusing is performed with the photographing lenses having been assembled to the barrel. More specifically, the focal distance adjustment is carried out with the respective photographing lenses being moved to their positions corresponding to the maximum focal distance and then with the respective photographing lenses being moved to their positions corresponding to the minimum focal distance of the zoom lens system. The typical initial focusing mechanism of prior art for zoom lens system is shown by FIG. 8 of the accompanying drawing. Referring to this figure which is a sectional view of the zoom lens system taken in the plane including an optical axis S, a barrel 1 is provided on a front end with a barrel section 2 adapted to be axially movable by a thread 2a for focusing, such as a helicoid and this movable barrel section 2 has initial focusing mechanism 3a comprising a screw or a cam by which the movable barrel section 2 supports a focusing lens frame 3 adapted, in turn, to hold a focusing lens 4.

The barrel 1 contains therein a cylinder cam 5 being rotatable with respect to the barrel 1 and this cylinder cam 5 is formed with cam tracks 5a, 5b adapted to support a variator frame 6a which holds a variator 6 and a compensator frame 7a which holds a compensator 7, respectively. Thus, rotation of the cylinder cam 5 causes the variator 6 and the compensator 7 to be guided by the cam tracks 5a, 5b, respectively, so that the variator 6 and the compensator 7 are moved along the optical axis with a given optical relationship between them being maintained. Such movement results in a change in the focal distance.

The barrel 1 is further provided on a rear end thereof with a relay lens frame 8a adapted to hold a relay lens 8. There is provided an eccentric pin 9 for initial focusing which extends through a wall of the barrel 1 and is supported rotatably with respect to the barrel 1. The eccentric pin 9 includes a pin section 9a in engagement with the relay lens frame 8a. This pin section 9a is in eccentric relationship with the rotational center of the eccentric pin 9 so that the pin section 9a swivels around the rotational center as the head section 9b of the eccentric pin 9 is rotated.

The initial focusing by use of this well known mechanism begins with movement of the variator 6, the compensator 7 and the focusing lens 4 to respective positions corresponding to the maximum focal distance of the zoom lens system. Then the initial focusing mechanism 3a associated with focusing lens 4 is adjusted and thereby the focusing lens 4 is moved along the optical axis until the focusing at the maximum focal distance is achieved. After the initial focusing mechanism 3a is locked, the variator 6, the compensator 7 and the focusing lens 4 are moved to respective positions corresponding to the minimum focal distance of the zoom lens system. From this state, the eccentric pin 9 is rotated to move the relay lens 8 along the optical axis until focusing at the minimum focal distance is achieved, then the eccentric pin 9 is locked in order to lock the relay lens 8 and thereby the composite initial focusing is completed.

However, with the initial focusing mechanism of the prior art as has been mentioned above, the initial focusing adaptor 3a and the thread 2a are provided in operative association with the focusing lens 4, resulting in that the barrel portion carrying the focusing lens 4 inclusive of adjustment devices 2a, 3a inconveniently has a relatively large outer diameter.

While it is preferred to minimize the outer diameter of the zoom lens system for improvement of the camera the characteristics such as maneuverability and portability, the outer diameter of the zoom lens system necessarily becomes larger than the diameter of the focusing lens 4 due to the presence of mechanisms 2a, 3a.

As has been described above, the initial focusing mechanism of prior art achieves the initial focusing by moving the focusing lens 4 along the optical axis with respect to the variator 6 and the compensator 7. In other words, the conventional initial focusing mechanism generally relies on a variation of the relative position or distance of the focusing lens 4 to the variator 6 and compensator 7.

In view of the fact that the initial focusing can be achieved by varying the relative position or distance of the focusing lens to the variator and the compensator, it is a principal object of the present invention to provide an improved initial focusing mechanism allowing a desired initial focusing to be achieved without incorporation of any initial focusing devices into the focusing lens system and thereby allowing the zoom lens to be compactly configured.

SUMMARY OF THE INVENTION

The object set forth above is achieved, according to the present invention, by an initial focusing mechanism comprising a cylinder cam contained by a barrel for rotation relative to the barrel for slidable movement along an optical axis; a variator and a compensator held by a variator frame and a compensator frame, respectively, which are, in turn, respectively engaged with a pair of cam tracks formed in the cylinder cam; and slide member adapted for adjustably and slidably moving the cylinder cam with respect to the barrel along the optical axis; wherein the variator and the compensator are moved along the optical axis by rotating the cylinder cam with respect to the barrel so as to obtain a continuous variation of the focal distance and the initial focusing is accomplished by slidably moving the cylinder cam along the optical axis utilizing the slide member.

These features can be also incorporated into a zoom lens system of rear focus type in which there is provided behind the variator and the compensator a relay lens so that the relay lens may be moved along the optical axis to focus the photographing lens system.

The object set forth is achieved, according to another aspect of the present invention, by an arrangement such that the slide member comprises a ring cam adapted to bear against one end of the cylinder cam and the cylinder cam is provided on the other end thereof with biasing spring adapted for normally urging the cylinder cam against the ring cam, wherein rotation of the ring cam around the optical axis slidably moves the cylinder cam along the optical axis against the restoring force of the biasing spring or an arrangement such that the barrel is provided with an eccentric pin having a pin section adapted to swivel around an axis extending diametrically of the barrel, one end of the cylinder cam bearing against a flank of the eccentric pin, and the cylinder cam is provided on the other end thereof with a biasing spring adapted for normally urging the cylinder cam against the eccentric pin so that rotation of the eccentric pin slidably moves the cylinder cam along the optical axis against the restoring force of the biasing spring.

In order to minimize the number of parts and thereby to obtain a lightweight camera, the invention provides an arrangement such that the slide member comprises a slot formed in the cylinder cam, so as to extend circumferentially thereof, and an eccentric pin extending through a wall of the barrel and being rototable with respect to the barrel, wherein the eccentric pin may be inserted into the slot and rotated with respect to the barrel to move the cylinder cam slidably along the optical axis.

For example, the zoom lens system may comprise four lens groups, i.e., a focusing lens group supported by the front end of the barrel, a variator lens group and a compensator lens group both supported by the cylinder cam, and a relay lens group supported by the rear end of the barrel. With these lens groups having been assembled to the barrel, these lens groups are moved along the optical axis and thereby the zoom lens system is set to its maximum focal distance. From such state, the slide member is operated to move the cylinder cam with respect to the barrel along the optical axis and thereby the relative distance of the focusing lens group to the variator and compensator lens groups is adjustably varied so as to achieve the initial focusing at the maximum focal distance of the zoom lens system.

Upon completion of the initial focusing at the maximum focal distance, the relative position of the cylinder cam to the barrel is locked and then the zoom lens system is set to its minimum focal distance. From this state, the relay lens group is adjustably moved along the optical axis to achieve the initial focusing at the minimum focal distance and then the relay lens group is locked to the barrel.

BRIEF DESCRIPTION OF THE DRAWING

FIG. 2 is a schematic perspective view of a barrel in the first embodiment, illustrating a slot formed in the barrel;

FIG. 3 is a perspective view of a ring cam in the first embodiment;

FIG. 4 is a fragmentary perspective view illustrating a relationship between the ring cam and the barrel in the first embodiment;

DETAILED DESCRIPTION OF THE INVENTION

Figure 5:
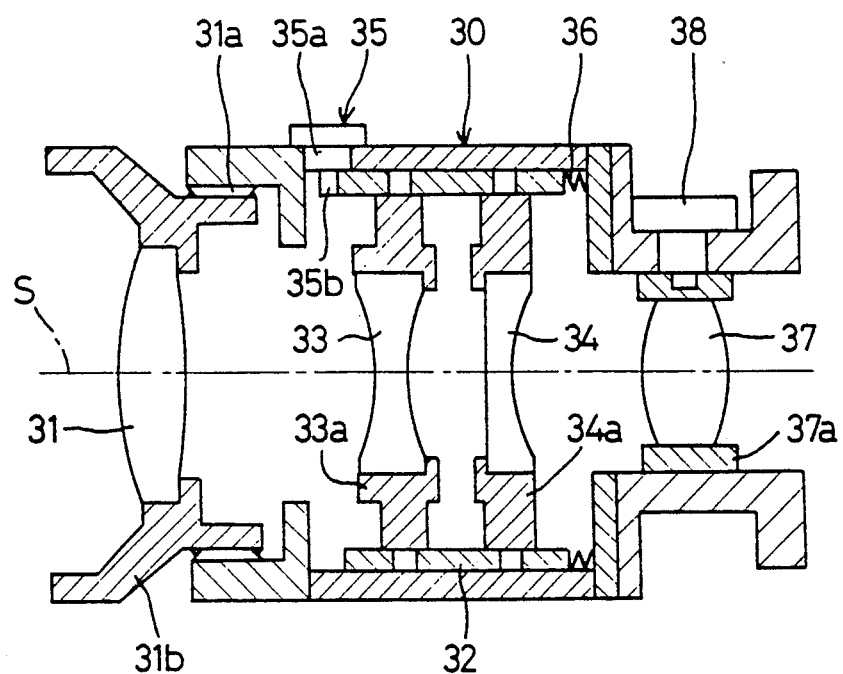
FIG. 5 is a sectional view taken in a plane including the optical axis, showing a second embodiment.
Figure 6:
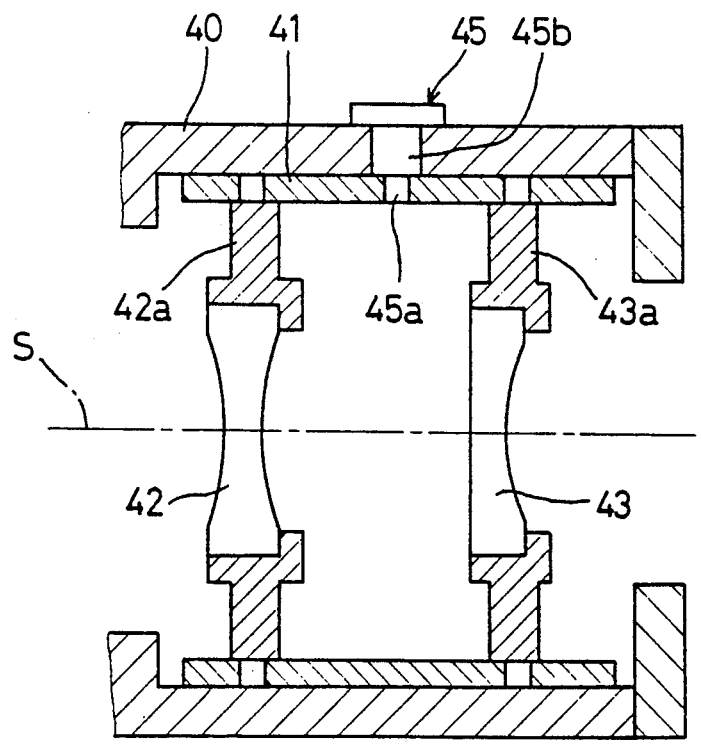
FIG. 6 is a sectional view taken in a plane including the optical axis, showing a portion of the zoom lens system carrying a cylinder cam in a third embodiment.
Figure 7:
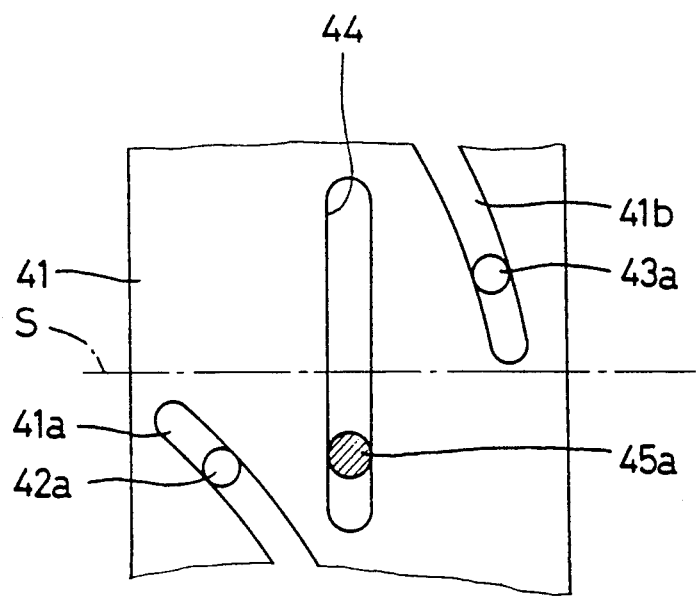
FIG. 7 is a schematic plan view partially broken away, showing the cylinder cam in the third embodiment.
Figure 8:
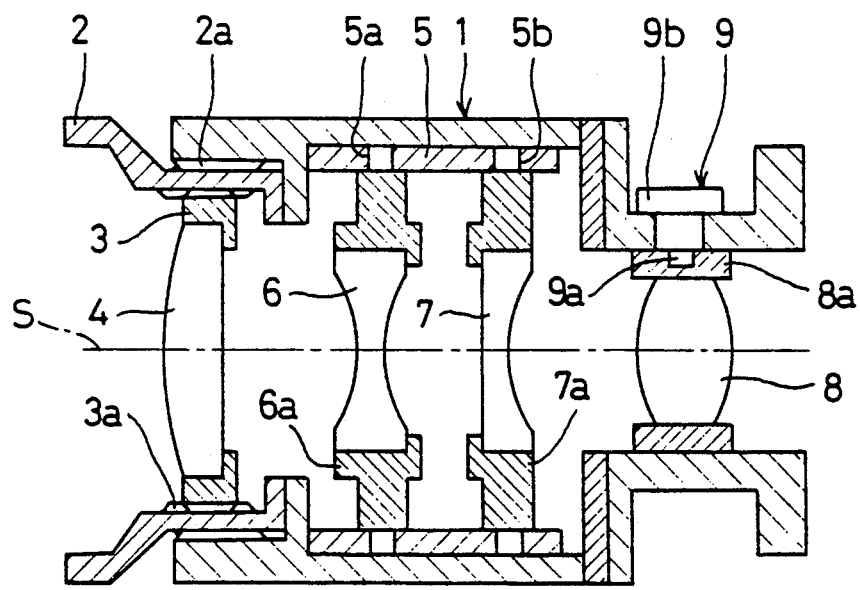
FIG. 8 is a view similar to FIG. 1 but schematically illustrating the typical initial focusing mechanism of the prior art.

Now the initial focusing mechanism according to the present invention will be described more in detail with reference to several specific embodiments shown by the accompanying drawing, in which FIGS. 1 through 4 illustrate a first embodiment, FIG. 5 illustrates a second embodiment and FIGS. 6 and 7 illustrate a third embodiment of the invention.

Embodiment 1

Figure 1:
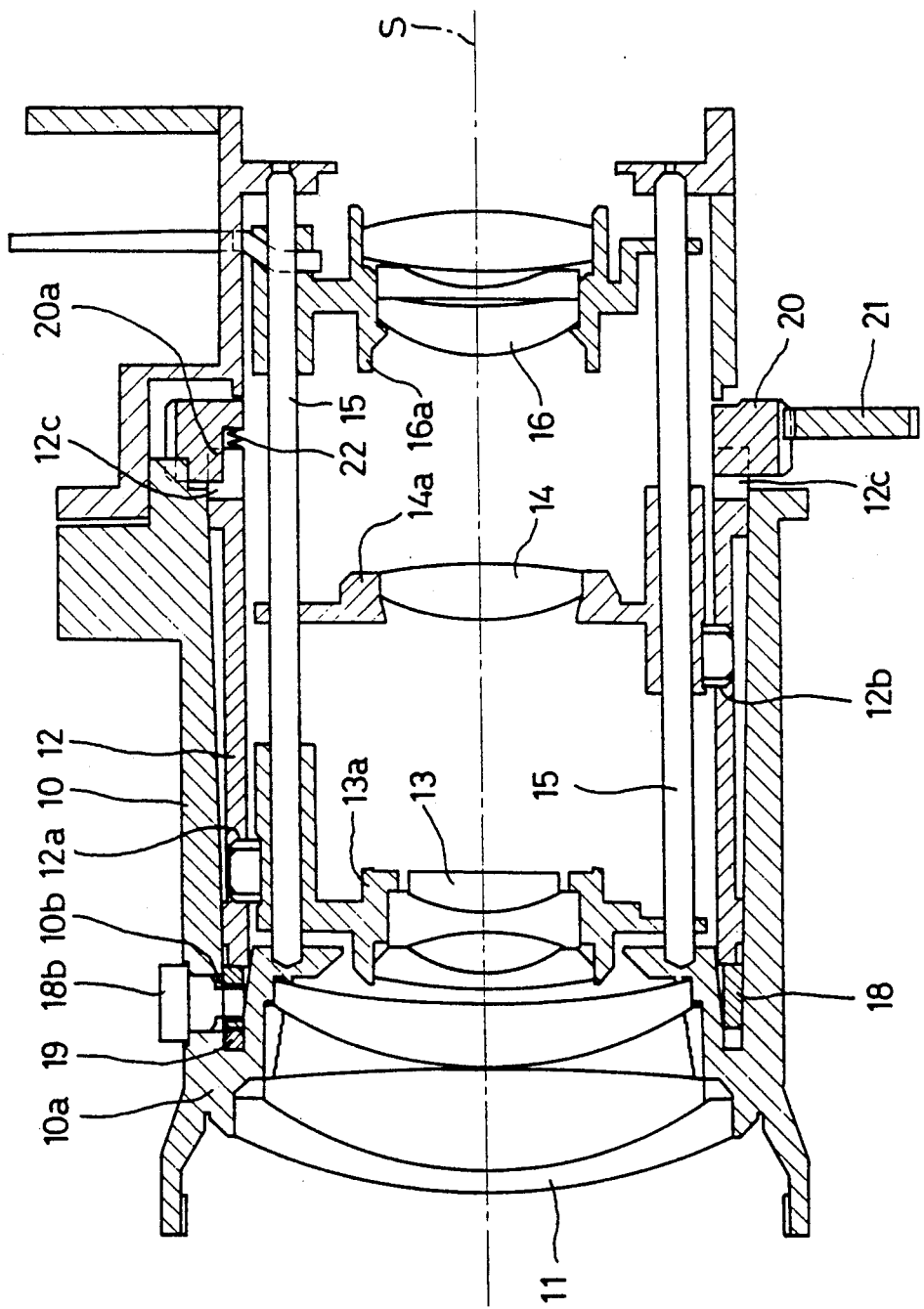
FIG. 1 is a sectional view taken in a plane including the optical axis, showing a first embodiment of the zoom lens system constructed according to the present invention.

FIG. 1 is a sectional view taken in a plane including the optical axis S, showing a zoom lens system provided with the first embodiment of the initial focusing mechanism constructed in accordance with teachings of the invention. A barrel 10 holds at its front end a front stationary lens 11 behind which a cylinder cam 12 is rotatably and slidably carried by the barrel 10. The cylinder cam 12 is formed with cam tracks 12a, 12b of appropriate configurations so that a variator frame 13a and a compensator frame 14a are partially engaged by these cam tracks 12a, 12b, respectively. The variator frame 13a holds a variator 13 and the compensator frame holds a compensator 14. There is provided within the barrel 10 a guide rod 15 extending through the variator frame 13a and the compensator frame 14a parallel to the optical axis S to guide movement of the variator 13 and compensator 14 along the optical axis S.

The barrel 10 has at its rear end a relay lens frame 16a and the guide rod 15 also extends through this relay lens frame 16a so that the relay lens frame 16a may be moved along the optical axis. The relay lens frame 16a holds a relay lens 16 adapted to fulfill its function as a focusing lens by its movement along the optical axis. Namely, this specific zoom lens system is of so-called rear focus type.

Between the front end of the cylinder cam 12 and a focusing lens holding portion 10a of the barrel 10, there is provided a ring cam 18 serving as slide mechanism which is rotatable around the optical axis S. The ring cam 18 is formed on the part of its surface opposed to the focusing lens holding portion 10a of the barrel 10 with a cam surface 18a, as shown by FIGS. 3 and 4.

Correspondingly, lens holding portion 10a of the barrel 10 is formed on its surface opposed to the cam surface 18a with a cam projection 19 adapted to be engaged with the cam surface 18a, as shown by FIGS. 1 and 4. The ring cam 18 is formed with a female thread 18c with which a set-screw 18b is engaged. As will be apparent from FIG. 2, the set-screw 18b is inserted into a slot 10b formed in the barrel substantially in parallel to the cam surface 18a and then engaged with the female thread 18c.

The cylinder cam 12 is formed, at an appropriate location adjacent the rear end thereof, with a notch 12c with which a boss 20a of a ring gear 20, having teeth therearound, is partially engaged so that rotation of the ring gear 20 causes the cylinder cam 12 to be rotated with respect to the barrel 10. Rotation of a motor (not shown) is transmitted through a gear train 21 having an appropriate reduction gear ratio to the said ring gear 20.

Between a rear end surface of the cylinder cam 12 and the ring gear 20, there is provided a compression spring 22 adapted to bias the cam surface 18a of the ring cam 18 against the cam projection 19 through the cylinder cam 12.

The initial focusing for the specific zoom lens system described above occurs in a sequence as will be described, after assembly of the zoom lens system.

First, the variator 13, the compensator 14 and the relay lens 16 are moved to their positions corresponding to the maximum focal distance of the zoom lens system and thereafter the ring cam 18 is rotated. The ring cam 18 is slightly moved in the direction of the optical axis as it is rotated, since the cam surface 18a of the ring cam 18 is normally biased against the cam projection 19 of the barrel 10. Movement of the ring cam 18 in the direction of the optical axis causes the cylinder cam 12 also to be moved along the optical axis because the front edge of the cylinder cam 12 normally bears against the ring cam 18. The cylinder cam 12 carries the variator 13 and the compensator 14, so the axial movement of the cylinder cam 12 causes the distance from the variator 13 and the compensator 14 to the front stationary lens 11 or the relay lens 16 to be varied. Thus, positions of the variator 13 and the compensator 14 at the maximum focal distance of the zoom lens system are given and thereby the initial focusing at the maximum focal distance is accomplished. Then the set-screw 18b is clamped to lock the initial focused position of the zoom lens system at the maximum focal distance thereof.

Now the cylinder cam 12 is rotated to move the variator 13, the compensator 14 and the relay lens 16 to their positions corresponding to the minimum focal distance of the zoom lens system and thereafter the relay lens 16 is moved along the optical axis to effect the inital focusing at the minimum focal distance. Such movement of the relay lens 16 may be done by use of an eccentric pin in the well known manner. Upon completion of this initial focusing at the minimum focal distance, the position of the relay lens is locked and thereby the composite initial focusing is completed.

In general, both the initial focusing at the maximum focal distance and the initial focusing at the minimum focal distance are repeated several times until the initial focuses at the maximum and minimum focal distances are optimized.

As will be apparently understood from this embodiment, incorporation of this initial focusing mechanism into the zoom lens system of rear focus type makes it unnecessary to provide the front stationary lens 11 with any initial focusing mechanism as well as focusing lens thrust mechanism and thereby allows the outer diameter of the barrel 10 adjacent its front end to be effectively reduced.

Embodiment 2

Referring to FIG. 5, which shows a second embodiment in a sectional view taken in a plane including the optical axis S, a barrel 30 supports at its front end a focusing lens frame 31b with interposition of focus driving mechanism 31a comprising, for example, a helicoid or cam member and the focusing lens frame 31b holds a focusing lens 31. The barrel 30 contains therein rotatably and slidably a cylinder cam 32 which is formed, in turn, with a pair of cam tracks serving to support a variator frame 33a serving to hold a variator 33 and a compensator frame 34a serving to hold a compensator 34, respectively.

Reference numeral 35 designates an eccentric pin serving as slide mechanism, comprising a drum section 35a rotatably extending through a wall of the barrel 30 and a pin section 35b projecting from a front end surface of the drum section 35a so that the peripheral surface of the pin section 35b normally bears against a front end of the cylinder cam 32. The pin section 35b of the eccentric pin 35 is in eccentric relationship with the rotational center of the eccentric pin 35 with respect to the barrel 30 so that rotation of the eccentric pin 35 with respect to the barrel 30 causes the pin section 35b to be swiveled around the rotational center. Between the rear end surface of the cylinder cam 32 and the barrel 30, there is provided a compression spring 36 comprising, for example, a corrugated washer so that the restoring force of the compression spring 36 normally biases the front end of the cylinder cam 32 against the pin section 35b of the eccentric pin 35.

The barrel 30 supports at a position adjacent its rear end a relay lens frame 37a which holds, in turn, a relay lens 37, allowing the relay lens 37 to be moved along the optical axis.

The initial focusing by this specific initial focusing mechanism begins with moving the focusing lens 31, the variator 33 and the compensator 34 along the optical axis to their positions corresponding to the maximum focual distance of the zoom lens system, followed by, from the state, rotating the eccentric pin 35. Rotation of the eccentric pin 35 causes the pin section 35b thereof to be swiveled around the rotational center of the eccentric pin 35 and the cylinder cam 32 to be moved along the optical axis because the front end of the cylinder cam 32 normally bears against the pin section 35b and the front end is normally biased by the compression spring 36 against the pin section 35b. The variator 33 and the compensator 34 are also moved as the cylinder cam 32 is moved, because the cylinder cam 32 carries the variator 33 and compensator 34. With the consequence, that the distance from the variator 33 and the compensator 34 to the focusing lens 31 is changed and thereby the initial focusing at the maximum focal distance of the zoom lens system is accomplished. Upon completion of this focusing, the eccentric pin 35 is fixed to the barrel, for example, with adhesive to lock the position of cylinder cam 32 with respect to the barrel 30.

Then, the variator 33 and the compensator 34 are moved in the direction of the rotating the cylinder cam 32 while the focusing lens 31 is moved by the focusing lens driving mechanism 31a, respectively, in the direction of the optical axis to their positions corresponding to the minimum focal distance of the zoom lens system, and then the eccentric pin 38 is rotated to move the relay lens 37 along the optical axis for the initial focusing at the minimum focal distance. Upon completion of this initial focusing at the minimum focal distance, the eccentric pin 38 is fixed to the barrel and thereby a composite initial focusing for the zoom lens system is completed.

Embodiment 3

Referring to FIG. 6 which partially shows a barrel 40 in a sectional view taken in a plane including the optical axis S, the barrel 40 contains therein a cylinder cam 41 rotatably and slidably mounted with respect to the barrel 40. This cylinder cam 41 is formed with cam tracks 41a, 41b (FIG. 7) serving to support a variator frame 42a and a compensator frame 43a, respectively. The variator frame 42a holds a variator 42 and the compensator frame 43a holds a compensator 43.

The cylinder cam 41 is formed at its middle portion as viewed in the direction of the optical axis with a slot 44 of a circumferentially appropriate length and a pin section 45a of an eccentric pin 45 is inserted into the slot 44. The eccentric pin 45 comprises a drum section 45b rotatably supported by the barrel 40 and the pin section 45a projecting from the drum section 45b at a position in eccentric relationship with the rotational center of the drum section 45b. Consequently, rotation of the eccentric pin 45 relative to the barrel 40 causes the section 45a to be swiveled around the rotational center.

When the eccentric pin 45 is rotated with respect to the barrel 40 after the variator 42 and the compensator 43 have been moved along the optical axis to their positions corresponding to the maximum focal distance of the zoom lens system, the pin section 45a of the eccentric pin 45 is swiveled within the slot 44 and thereby the cylinder cam 41 is moved along the optical axis. Such movement of the cylinder cam 41 causes a distance from the variator 42 and compensator 43 to the focusing lens (not shown) to be adjustably changed for the initial focusing at the maximum focal distance.

The initial focusing at the minimum focal distance occurs in the same manner as in the cases of the previously described first and second embodiments.

The arrangement of the third embodiment allows the biasing springs such as the compression springs 22, 36 employed by the first and second embodiments, respectively, to be eliminated and thereby allows the number of parts to be effectively reduced.

Effect of the Invention

As will be apparent from the foregoing description, the initial focusing mechanism includes a cylinder cam adapted to be slidably moved along the optical axis together with the variator and the compensator both carried thereby so that the initial focusing may be achieved by adjustably moving the cylinder cam along the optical axis to adjust a distance from the variator and compensator to the focusing lens or the like. Such feature makes it unnecessary to provide the focusing lens or the like located at the front end of the zoom lens system with any initial focusing mechanism. With an advantageous consequence, the part of the zoom lens system holding the focusing lens or the like can be configured so as to have an effectively reduced outer diameter, not only allowing the zoom lens system to be made compact but also allowing portability of the zoom lens system to be improved.

In addition, it is enabled by the invention to achieve the initial focusing merely by slidably moving the cylinder cam with respect to the barrel and, therefore, the operation required for the initial focusing is substantially simplified. Furthermore, the initial focusing mechanism of the invention requires no complicated arrangement in the mechanism for slidable movement of the cylinder cam as well as in the mechanism for adjustment of an amount by which the slidable movement occurs as the well known zoom lens system utilizing the front focusing lens or the like has conventionally required for the initial focusing. Thus, the invention provides the initial focusing mechanism of substantially simplified structure.

What is claimed is:

1. An initial focusing mechanism for a zoom lens system comprising:

a cylinder cam contained within a barrel for rotational movement and slidable movement along an optical axis both with respect to said barrel;

a variator and a compensator held by a variator frame and a compensator frame, respectively, which are, in turn, respectively supported by said cylinder cam by engagement with a pair of cam tracks formed in said cylinder cam;

slide means adapted for slidably moving said cylinder cam along the optical axis with respect to said barrel and for adjustment of an amount by which said cylinder cam is slidably moved to achieve a desired initial focusing; and means for rotating said cylinder cam with respect to the barrel to move said variator and compensator along the optical axis for continuous change of a focal distance.

2. An initial focusing mechanism for a zoom lens system of rear focus type comprising:

a cylinder cam contained within a barrel for rotational movement and slidable movement in the direction of an optical axis both with respect to said barrel;

a variator and a compensator held by a variator frame and a compensator frame, respectively, which are, in turn, respectively supported by said cylinder cam by engagement with a pair of cam tracks formed in said cylinder cam;

a relay lens located behind said variator and compensator;

slide means adapted for slidably moving said cylinder cam with respect to said barrel along the optical axis and for adjustment of an amount by which said cylinder cam is slidably moved to achieve a desired initial focusing;

means for rotating said cylinder cam with respect to the barrel to move said variator and compensator along the optical axis for continuous change of a focal distance; and means for moving said relay lens along the optical axis for focusing.

3. An initial focusing mechanism for a zoom lens system as recited in claim (1) or (2), wherein said means for rotating said cylinder cam includes:

a ring gear normally bearing against one end of said cylinder cam;

biasing means adapted for normally urging said cylinder cam against said ring gear; and said slide means slidably moving said cylinder cam along the optical axis against a restoring force of said biasing means as said ring gear is rotated around the optical axis.

4. An initial focusing mechanism for a zoom lens system as recited in claim (1) or (2), further comprising:

an eccentric pin mounted on said barrel for swiveling around an axis extending diametrically of said barrel;

one end of said cylinder cam bearing against a lateral surface of said eccentric pin;

biasing means adapted for normally urging said cylinder cam against said eccentric pin; and said slide means slidably moving said cylinder cam along the optical axis against a restoring force of said biasing means as said eccentric pin is swiveled.

5. An initial focusing mechanism for a zoom lens system as recited in claim (1) or (2), further comprising:

a circumferential slot formed in said cylinder cam;

an eccentric pin rotatably extending through said barrel and inserted into said slot; and said slide means slidably moving said cylinder cam along the optical axis as said eccentric pin is rotated with respect to the barrel.

* * * * *